United States Patent Office

3,522,930
Patented Aug. 4, 1970

3,522,930
ROTARY BALL VALVE AND SEAL THEREFOR
Cecil Graham Francis Richards, Aspley, Brisbane,
Queensland, Australia, assignor to B. C. Richards
& Co., Pty. Ltd., Brisbane, Queensland, Australia,
a corporation of Australia
Filed May 31, 1968, Ser. No. 733,713
Claims priority, application Australia, May 30, 1967,
22,539; Sept. 8, 1967, 26,980
Int. Cl. F16k 5/06
U.S. Cl. 251—315                                5 Claims

ABSTRACT OF THE DISCLOSURE

A sealing assembly for a rotary ball valve having a seal ring and a resilient backing ring, has a rigid retaining ring of obtuse-angled L-section engaging the rear and inner radial faces of the backing ring. A ball valve using such assemblies may have a single piece tubular body and be assembled by insertion of parts into the tube.

---

This invention relates to the construction of rotary ball valves, and is particularly related to seals used against the surface of the ball surrounding the flow passage therethrough.

It is one object of the invention to provide a ball-valve of simple and reliable type, which may be constructed without complex processing operations and is therefore cheap, and yet will provide a long-lasting and effective seal against the ball.

The sealing assembly of this invention is particularly applicable to small ball-valves in which the whole ball and sealing assembly is installed in the bore of a tube forming the body of the valve, the installation being effected by inserting the parts of the sealing assemblies, the ball and the ball operating mechanism into the tube bore through an end thereof, as will be later described. The sealing assembly, may however, be used in valves other than this type.

The seal ring contacting the ball surface is preferably made of such plastics as poly-tetrafluoro-ethylene (PTFE) which are slow to recover their form after deformation. Such materials will be generally referred to as "slow-recovery materials."

To ensure that the seal remains effective in spite of slight movements of the ball under fluid pressure, it is desirable that the seal ring be movable as a whole and remain pressed against the ball surface by reason of a spring or resilient force applied on the side away from the ball.

The sealing assembly of the present invention is of the type in which the seal ring is backed by a resilient backing ring exerting such force upon it. It has been found that resilient backing rings of this type, are in general not satisfactory in that when urged towards the seal ring they tend to squeeze radially inwards and do not exert enough outward radial pressure on the valve body to make an adequate seal therewith.

It is a further object of this invention to provide a sealing assembly using a resilient backing ring, in which the backing ring is made to exert effective pressure both on the ball and outwards against the valve body.

Accordingly, the invention in one aspect comprises a sealing assembly for a rotary ball valve including, a seal ring to seal at its front face against the surface of the ball, a backing ring of resilient material bearing on the rear radial face of said seal ring, and a rigid retaining ring of substantially L-shaped cross section abutting the rear radial face of said backing ring and the inner axial face of said backing ring, in which the L-shaped cross-section is obtuse-angled.

The retaining ring and the inner surface of the valve body therefore "cage" the backing ring in such a way that it is prevented from expanding radially inwards and therefore exerts adequate pressure on the ball and on the inner surface of the body and makes an effective seal against the latter.

The invention also comprises a particular form of rotary ball-valve incorporating this sealing assembly, as will be later described.

In order that the invention may be better understood, exemplary embodiments will now be described with reference to the accompanying drawings, in which.

Figure 1:
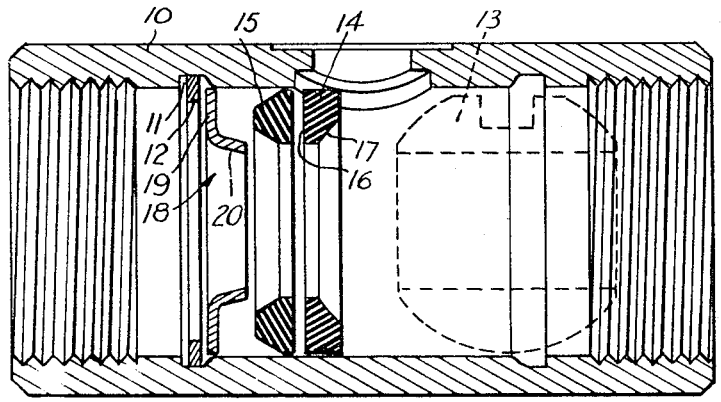
FIG. 1 shows in section a sealing assembly mounted loosely in a valve body.

Referring first to FIG. 1, in which the components of the sealing assembly are shown separated for clarity, a tubular valve body 10 is shown having an inner circumferential recess 11 holding a circlip 12. The sealing assembly is between circlip 12 and a ball 13 (shown dotted). The PTFE seal ring 14 fits slidably within body 10 and is backed by a resilient backing ring 15 bearing on the rear radial face 16 of ring 14. The front face 17 of ring 14 is shaped to fit the surface of ball 13.

A rigid retaining ring 18 lies between the ring 15 and circlip 12. Retaining ring 18 is of generally L-shaped cross-section, the radial part 19 forming a slightly obtuse angle with the axial part 20.

In assembled position (see FIG. 2) resilient backing ring 15 is compressed between seal ring 14 and part 19 of retaining ring 18. Ring 15 tends to spread radially inwards, but abuts part 20 of ring 18 and is "caged" between parts 19, 20 and the body 10, owing to the obtuse angle between parts 19, 20, ring 18 as it is pressed against ring 15 progressively wedges ring 15 outwards to seal peripherally against body 10 (as shown in FIG. 2).

FIG. 1 shows that the ring 15 is chamfered on both its inner and outer surfaces towards its rear radial face. The inner chamfer corresponds reasonably closely with the slope of axial part 20 of ring 18. The outer chamfer, when not under pressure, diverges from the inner surface of body 10.

Figure 2:
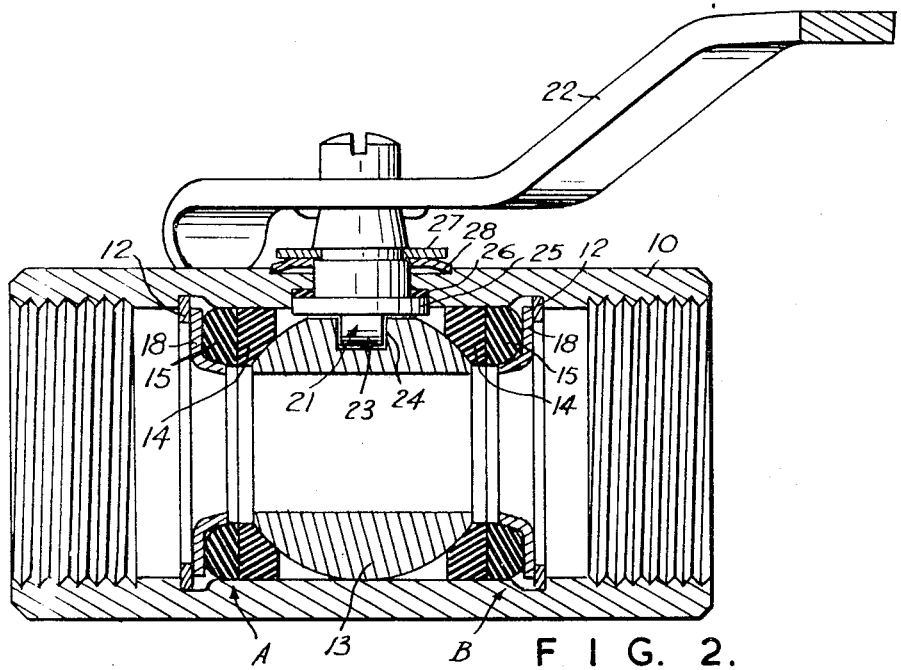
FIG. 2 shows, also partly in section, a rotary ball valve in assembled condition, using two of the assemblies shown in FIG. 1.

As pressure is applied by ring 18 to ring 15, the inner face of ring 15 is contained by part 20 and the ring is distorted progressively outwards to give more and more contact surface between the outer face of ring 15 and the body 10, as shown in FIG. 2. Thus the peripheral surface seal remains effective despite considerable movement of seal ring 14 with respect to ring 18. Wear of ring 14 is therefore taken up.

Considerable pressure can therefore be built up in resilient ring 15 which urges seal ring 14 into sealing contact with ball 13 and also creates an effective outside pressure seal between ring 15 and body 10.

Turning to the valve shown in FIG. 2, two sealing assemblies A and B, each as in FIG. 1, are used, one each side of ball 13.

Body 10 consists of a section of heavy tube internally threaded at each end, ball 13 and the assemblies A and B being a snug fit within the tube bore.

The tube body 10 is radially apertured to take a ball-actuating member 21, to which is attached an operating handle 22. Member 21 has a diametral rib 23 across its inner end which engages in a slot 24 in the ball, so that, when member 21 is turned, it turns the ball between valve-open and valve-closed positions.

A flange 25 on member 21 engages a PTFE washer 26 on a shoulder in the radial aperture of body 10.

A circlip 27 on member 21 retains a spring washer 28 in compression against the outside of body 10.

The assembly of the valve shown is particularly easy. Member 21 is first passed into body 10 and through its aperture, and washer 28, circlip 27 and the handle assembly attached.

The circlip 12 of assembly A is fixed, and rings 18, 15 and 14 inserted. Member 21 is turned so that rib 23 lies along the tube 10 and ball 13 inserted in valve-closed position to engage slot 24 with rib 23. Rings 14, 15 and 18 of assembly B are inserted and compressed, and circlip 12 of assembly B engaged.

Particular advantages of the valve are:

(a) The effective sealing as previously described.

(b) The simplicity of construction owing to the one piece tubular body and the avoidance of a multi-section stem bonnet, (c) The convenient assembly through the tube body.

The valve described essentially has a ball aperture of less diameter than the tube bore, but this feature is of no importance in many applications.

The sealing assembly of FIG. 1 can clearly be used in other valves of more complex construction, for example straight-through ball valves in which the ball aperture is of the same diameter as that in the body.

In a further modification (not shown) the seal ring may be made of resilient material and the seal ring and backing ring be integral with one another. In this case the L-section retaining ring will extend close to, but not touching, the ball surface to prevent inward deformation of the sealing face under pressure.

I claim:

1. A sealing assembly for a rotary ball valve, said assembly including a seal ring to seal at its front face against the surface of the ball, a backing ring of resilient material bearing on the rear face of said seal ring, said backing ring being formed with a rear radial face and an inner axial face, and a rigid retaining ring of generally L-shaped cross-section abutting said rear radial face of said backing ring and said inner axial face of said backing ring, the included angle of said generally L-shaped cross-section being obtuse.

2. The sealing assembly of claim 1 in which said backing ring is chamfered towards said rear radial face on both its inner and outer faces.

3. The sealing assembly of claim 1 in which the outer diameter of said seal ring is equal to the maximum outer diameter of said backing ring.

4. A rotary ball valve including a body formed from a section of tube of constant internal diameter, a ball-actuating member mounted in a radial aperture through said tube, a diametral rib across the inner end of said member, an apertured ball slotted to engage said rib, two circlips each retained in an internal slot in said tube, one slot being located on each side of said ball, and a sealing assembly retained under compression between each circlip and the surface of the ball, each said assembly being similar and each including a seal ring to seal at its front face against the surface of said ball, a backing ring of resilient material bearing on the rear face of said sealing ring, said backing ring being formed with a rear radial face against the surface of said ball, a backing ring of generally L-shaped cross-section abutting said rear radial face of said backing ring and said inner axial face of said backing ring, the included angle of said generally L-shaped cross-section being obtuse.

5. A ball valve as claimed in claim 4, in which the backing ring in each said assembly is chamfered towards said rear radial face on both its inner and outer faces.

References Cited

UNITED STATES PATENTS

| | | | |
|---|---|---|---|
| 2,373,925 | 4/1945 | Townhill | 251—174 X |
| 2,628,809 | 2/1953 | Mikeska | 251—317 |
| 2,919,886 | 1/1960 | Hurst | 251—315 X |
| 2,973,182 | 2/1961 | Gill | 251—315 X |
| 3,348,805 | 10/1967 | Sanctuary | 251—315 |
| 3,357,679 | 12/1967 | Gulick | 251—315 X |
| 3,411,746 | 11/1968 | Scaramucci | 251—315 |
| 3,425,663 | 2/1969 | Priese | 251—315 X |

M. CARY NELSON, Primary Examiner

M. O. STURM, Assistant Examiner